United States Patent [19]

Renegar et al.

[11] Patent Number: 5,302,118
[45] Date of Patent: Apr. 12, 1994

[54] SOIL REMEDIATION APPARATUS

[75] Inventors: James G. Renegar, East Ridge, Tenn.; Malcolm L. Swanson, Chickamauga, Ga.

[73] Assignee: Astec Idustries, Inc., Chattanooga, Tenn.

[21] Appl. No.: 14,767

[22] Filed: Feb. 8, 1993

[51] Int. Cl.$^5$ .............................................. F27B 7/00
[52] U.S. Cl. .................................... 432/14; 432/103; 432/106; 110/246; 110/216; 47/1.42
[58] Field of Search ............... 110/346, 236, 238, 216, 110/246; 432/106, 14, 103; 47/1.42

[56] References Cited

U.S. PATENT DOCUMENTS

| | | |
|---|---|---|
| 4,211,490 | 7/1980 | Brock et al. . |
| 4,555,182 | 11/1985 | Mendenhall . |
| 4,648,333 | 3/1987 | Mudd et al. . |
| 4,827,854 | 5/1989 | Collette . |
| 4,957,429 | 9/1990 | Mendenhall . |
| 5,085,581 | 2/1992 | Mendenhall ........................ 432/103 |
| 5,129,334 | 7/1992 | Mize . |
| 5,176,445 | 1/1993 | Mize . |
| 5,240,412 | 8/1993 | Mendenhall ........................ 110/246 |

FOREIGN PATENT DOCUMENTS 3216771 12/1982 Fed. Rep. of Germany .

Primary Examiner—Henry C. Yuen
Attorney, Agent, or Firm—Nilles & Nilles

[57] ABSTRACT

An apparatus and method for decontaminating petroleum contaminated soil and the like, and which comprises a rotary drum dryer which is adapted to convey the soil therethrough, and which includes a burner at one end for generating a heated gas stream which passes through the dryer to heat the soil to a temperature sufficient to volatilize the contaminates. A fixed enclosure is mounted to surround the discharge end of the dryer and the enclosure receives the heated soil as it is discharged from the dryer. Any entrained dust particles which are withdrawn with the exhaust gas stream from the dryer, and which may remain contaminated, are separated from the gas stream and returned to the enclosure. In the enclosure, the returned dust is mixed with the heated soil so as to cause the dust to be heated and to release its volatile contaminates, without risk of the returned dust being again entrained in the gas stream flowing through the dryer. Also, the volatilized contaminates released from the dust will be drawn back into the gas stream passing through the dryer and a significant portion thereof will be oxidized by the burner flame.

15 Claims, 2 Drawing Sheets

SOIL REMEDIATION APPARATUS

BACKGROUND OF THE INVENTION

The present invention relates to an apparatus for the decontamination of soil under environmentally acceptable conditions.

The effective cleanup and disposal of soils which are contaminated with petroleum products and other contaminates have recently become major environmental concerns. As one specific example of the problem, a large number of underground fuel tanks have been found to be leaking and releasing a variety of contaminates into the surrounding soil, and as these tanks are being removed and repaired pursuant to environmental regulations, the volume of contaminated soil has been growing. Many communities no longer permit such soil to be placed in landfills, and thus a need exists for the decontamination of the soils.

In one conventional system for treating and decontaminating such soils, the soils are heated in a rotary drum dryer to a temperature sufficient to volatilize the hydrocarbons and other contaminates, and possibly also oxidize the contaminates. The gas stream is then removed from the drum dryer and delivered to a cyclone separator or baghouse, where the fine dust particles are removed from the gases. Also, the dust particles which are removed by the cyclone separator or baghouse are delivered onto the discharge screw conveyor which conveys the heated soil which has been discharged from the drum dryer to a suitable stockpile or storage area. A system of this general type is disclosed for example in U.S. Pat. No. 4,827,854 to Collette.

It has been recognized that in the above process, the potential exists for some portion of the entrained dust particles which leave the drum dryer with the exhaust gases to remain contaminated, and these contaminated particles are untreated. U.S. Pat. No. 5,176,445 to Mize discloses a decontamination process wherein the exhaust gases and entrained particles are delivered to an incinerator before delivery to the dust separator, and the incinerator acts to oxidize and decontaminate the contaminated dust before separation. However, the cost of an incinerator which is capable of properly treating the dust as well as the exhaust gases, can be significant.

Another proposed solution for ensuring the proper treatment of the airborne dust particles in a soil remediation plant is disclosed in U.S. Pat. No. 4,957,429 to Mendenhall. The Mendenhall patent discloses a rotary drum dryer for heating the soil, and wherein the exhaust gases are fed through a cyclone separator and a baghouse to separate and remove the entrained dust particles from the airstream, and with the gases then being delivered to a furnace which oxidizes the gaseous contaminates. The removed dust particles are returned to the interior of the drum dryer, so that the dust particles are again heated with the contaminated soil in the dryer. The patent states that this process can reduce the concentration of volatilizable organic composition to less than about 100 parts per million in the resulting mixture.

It is believed that the recycling of the dust particles back into the drum dryer as disclosed in the above Mendenhall patent will inevitably permit some of the same dust to be re-entrained in the gas stream in the dryer and again removed to the dust separators, and that the system will eventually become overloaded.

It is accordingly an object of the present invention to provide an apparatus and method for effectively and economically decontaminating petroleum contaminated soils and the like.

It is a more particular object of the present invention to provide an apparatus for decontaminating soils, and which effectively avoids the potential for a portion of the dust particles which are entrained in the exhaust gas stream to be untreated and remain contaminated when the gas stream is released to the atmosphere.

SUMMARY OF THE INVENTION

The above and other objects and advantages of the present invention are achieved in the embodiment illustrated herein by the provision of an apparatus and method which comprises a rotary drum dryer having an inlet end for receiving particulate material such as contaminated soil to be processed, and an opposite discharge end for discharging the material therefrom. A burner is provided for delivering heated gases into one of the ends of the drum, and an air exhaust duct is provided adjacent the other of the ends of the dryer for the removal of the heated gases, and so that the heated gases and any entrained dust particles pass through the dryer and are removed from the interior of the dryer. A drive is provided for rotating the dryer so as to convey the soil therethrough in a cascading fashion as the drum rotates, and so that the soil is heated by contact with the heated gases. Also, an air cleaning separator is connected to the air exhaust duct of the dryer for removing the dust particles which are entrained with the gases removed from the dryer. In the preferred embodiment, the burner is positioned at the discharge end of the dryer and the air exhaust duct is positioned adjacent the inlet end of the dryer, such that the heated gases flow through the dryer in a direction counter to the movement of the soil.

In accordance with the present invention, an enclosure is fixedly mounted so as to enclose the discharge end of the dryer, and the heated soil which is discharged from the discharge end is received therein. Also, means are provided for conveying the dust particles removed by the air cleaning separator into the enclosure. The heated soil and the dust particles which are received in the enclosure are intermixed and then removed from the enclosure.

In the preferred embodiment, the enclosure comprises a sleeve which coaxially surrounds the discharge end of the dryer, and a material discharge opening is provided in one side of the sleeve. Also, a plurality of rake out paddles are mounted to the outer periphery of the dryer and so that the paddles sweep any material received in the sleeve through the discharge opening during rotation of the dryer.

The means for conveying the dust particles from the air cleaning separator preferably includes an inlet opening communicating with the side of the sleeve opposite the discharge opening. Also, the dryer includes internal flights adjacent the discharge end of the dryer which act to lift the heated soil and shower it into the enclosure at a location adjacent the inlet opening for the dust particles. As a result, the heated soil and the returned dust particles are intermixed and conveyed to the discharge opening by the paddles, and there is sufficient residence time in the enclosure so that the dust particles absorb heat from the heated soil and the volatiles in the dust particles are thereby driven off. The released volatiles are then drawn back to the gas stream passing through the dryer and during this movement they are passed through or adjacent the burner flame and incinerated. Any remaining volatiles which are not incinerated by the burner flame will pass through the drum dryer, and through the separator, and to an incinerator which is preferably positioned downstream of the separator.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENT

Figure 1:
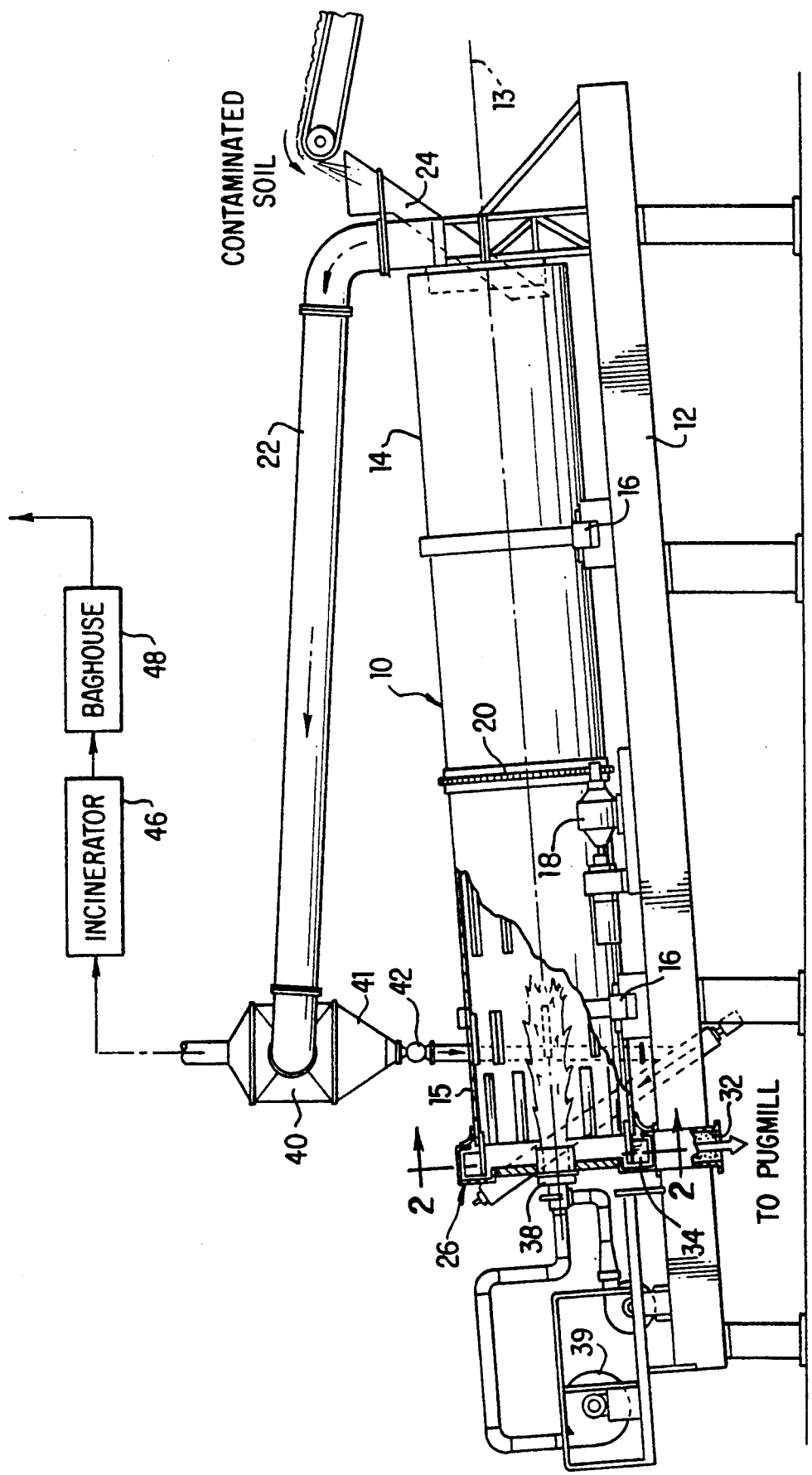
FIG. 1 is a side elevation view of an apparatus which embodies the features of the present invention.

Referring more particularly to the drawings, FIG. 1 illustrates an apparatus which embodies the features of the present invention, and which comprises a rotary drum dryer 10 which is rotatably mounted on a support frame 12 so as to define a central axis 13 which is inclined with respect to the horizontal, and to thereby define an upper end 14 and a lower end 15 of the dryer.

The dryer 10 is rotatably mounted on the support frame 12 by means of bearings 16 and it is rotatably driven by a motor 18 which operatively drives a sprocket 20 which is fixed in encircling relation to the exterior to the drum. The dryer 10 typically has a diameter of about seven feet, and it is rotated at a speed of about two to three rpm.

An exhaust air duct 22 communicates with the upper end of the drum dryer. Also, an inlet 24 for the contaminated soil is positioned adjacent the upper end of the dryer for introducing the soil into the interior of the dryer while it is rotating about the central axis 13. The opposite or lower end of the dryer defines an outlet which opens into an enclosure 26.

Figure 2:
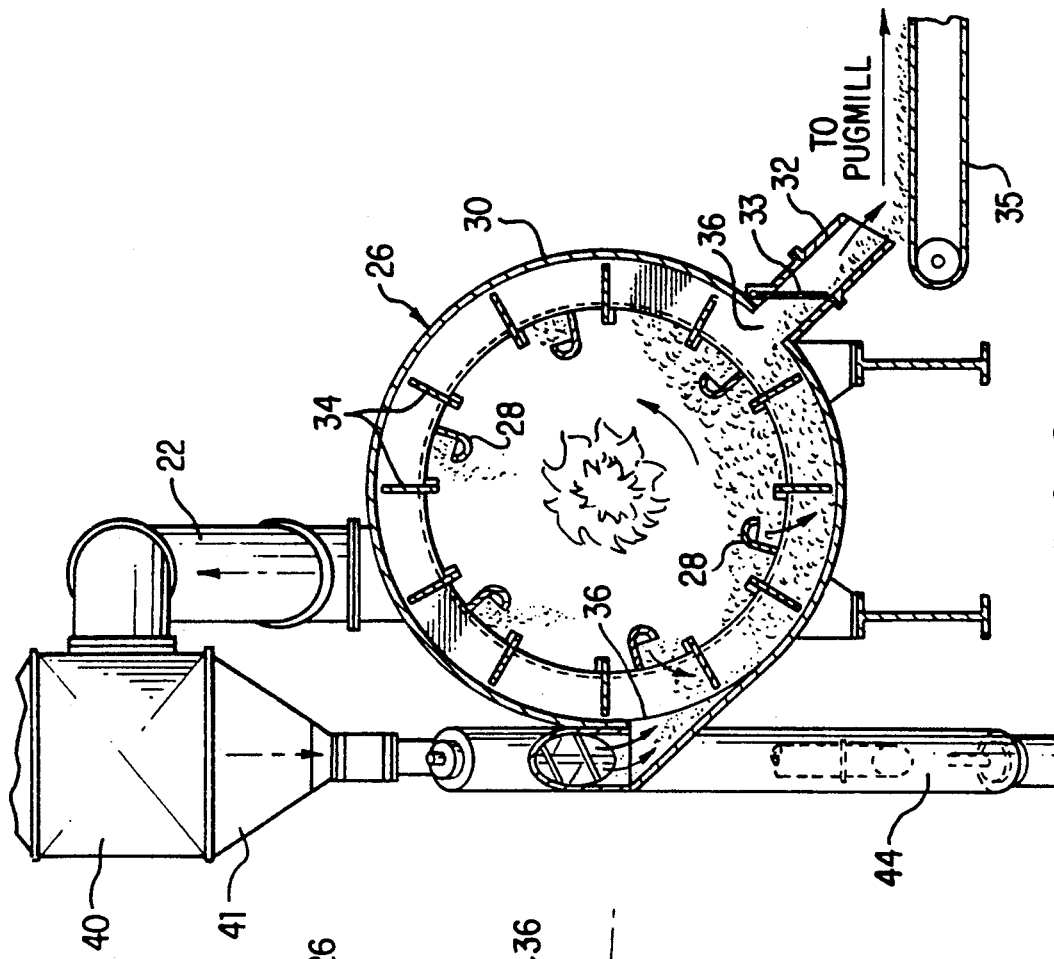
FIG. 2 is an end sectional view taken substantially along the line 2—2 of FIG. 1.

The interior of the dryer 10 incorporates a plurality of flights 28 of conventional design, for causing the soil which is introduced through the inlet 24 to be lifted and cascaded through the interior of the dryer and moved to the outlet as the dryer rotates. Of particular interest, and as best seen in FIG. 2, the flights 28 adjacent the outlet end of the drum are of J-shaped configuration, and these flights serve to lift the heated soil and shower it into the lower left side of the enclosure 26, and as further described below.

The enclosure 26 comprises a sleeve 30 which is fixedly mounted so as to coaxially surround the discharge end of the dryer 10 and such that any soil discharged through the outlet end of the dryer is received therein. In order to remove the soil received in the sleeve, the sleeve includes a discharge opening 31 through the right side thereof as seen in FIG. 2, and there are provided a plurality of rake out paddles 34 which are mounted to the exterior of the dryer 10 for sweeping any such soil or material received in the sleeve 30 along the sleeve and through the discharge opening 31 during rotation of the dryer. The discharge opening 31 communicates with a duct 32 having a conventional flop gate 33 to limit the entry of air, and the duct 32 preferably communicates with a suitable conveyor 35 for conveying the removed material to a pugmill (not shown) where it may be mixed with water to control the dust, and then to a separate location for stockpiling or other use. The sleeve 30 also includes an inlet opening 36 in the side of the sleeve opposite the side having the discharge opening 31, i.e., the left side as seen in FIG. 2.

A gas burner 38 is mounted at the lower or discharge end of the dryer 10 for delivering heated gases into the interior of the dryer. The burner 38 receives air from a blower 39 which is heated by the burner, and such that the heated gas flows through the dryer to the exhaust air duct 22. The burner 38 is of conventional design, and it acts to spray a jet of oil droplets into a cylindrical combustion chamber where the droplets are vaporized and ignited.

Figure 3:
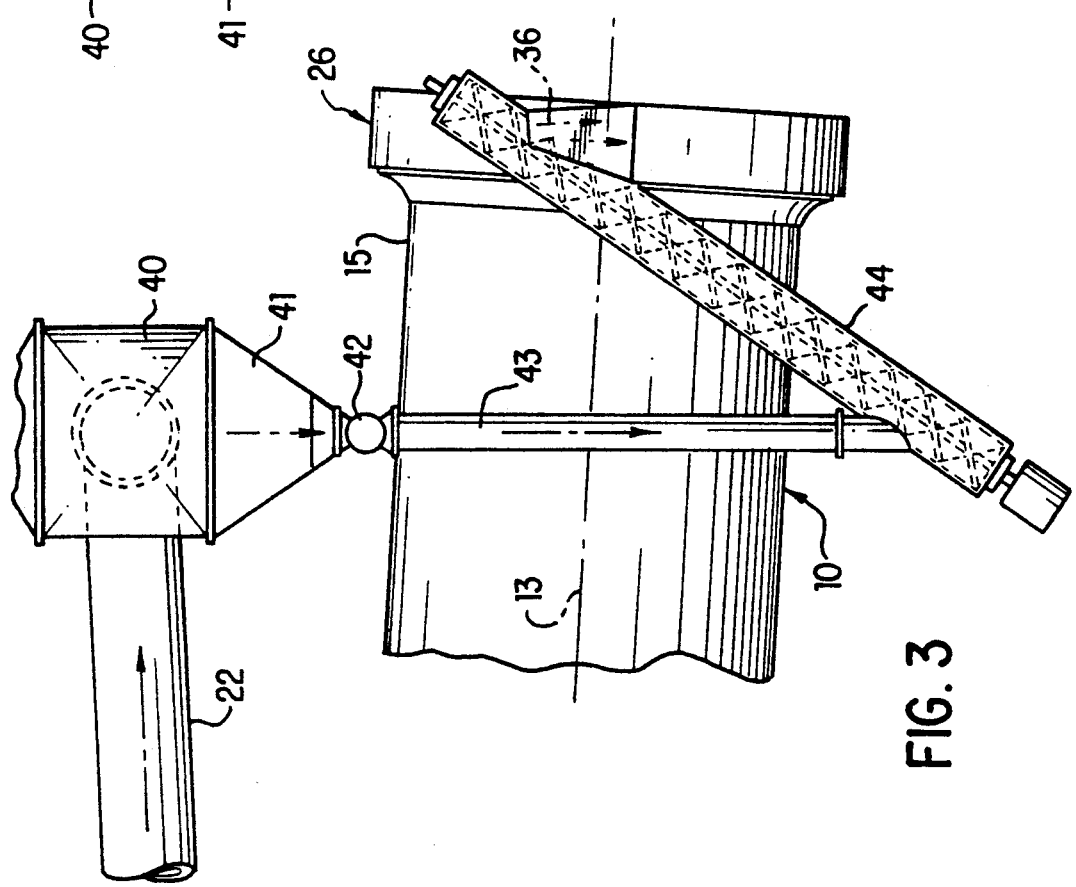
FIG. 3 is a fragmentary side elevation view of the opposite side of the apparatus as seen in FIG. 1.

The heated gases which pass through the dryer 10 and exhaust through the duct 22 are delivered to a cyclone separator 40 of conventional design, and wherein the entrained dust particles are separated from the gaseous airstream. In such a cyclone separator, the dust particles settle to the bottom of the separator, where they are discharged into a collector funnel 41 and withdrawn through a suitable air lock 42 and to a vertical discharge pipe 43. The pipe 43 in turn delivers the dust particles to a screw conveyor 44 having suitable air locks (not shown) which serves to transport the collected dust particles into the inlet opening 36 of the sleeve 30 as best seen in FIGS. 2 and 3.

With a counterclockwise rotation of the drum as illustrated in FIG. 2, the inlet opening 36 is located at about the horizontal center line on the "downhill" side of the sleeve, such that the returned dust will mix with and be heated by the treated soil which falls from the discharge end of the dryer. More particularly, the heated soil is showered into the left side of the sleeve as seen in FIG. 2, and thus it immediately comes in contact with the returned dust as it enters through the opening 36. Due to the relatively slow rotational speed of the drum, there is sufficient time for the returned dust to be heated by the heat of the showered soil so as to volatilize any contaminants in the dust. Further, the returned dust and the heated soil are intermixed as the rake out paddles 34 sweep the mixture toward the discharge opening 32.

It will be seen that the returned dust is protected from the high gas velocities existing in the interior of the dryer, and yet any volatiles removed from the dust in the sleeve will tend to be drawn back to the gas stream in the dryer and thus move directly past the burner flame. As a result, most of the volatilize contaminants will be oxidized by the heat of the flame. The mixing and aeration of the returned dust particles and the treated soil may be increased by increasing the number and varying the shape of the rake out paddles 34. If desired for particular applications, further mixing can be provided along the discharge conveyer 35, which may be enclosed so that any volatilized contaminates may be vented back to the burner.

The apparatus of the present invention also preferably includes an incinerator 46 which receives the cleaned gases from the cyclone separator 40, and a baghouse 48 for the final cleaning of the airstream before it is released to the atmosphere.

In operation, the contaminated soil is fed into the soil inlet 24 of the dryer at a controlled feed rate, and as the dryer rotates, the soil cascades through the interior of the drum and moves counter to the direction of the gases coming from the burner 38 which is located at the lower or discharge end 15 of the dryer. The soil is thereby progressively heated and dried, and its contaminates are volatilized and removed as the soil approaches the burner. The decontaminated soil is then delivered from the discharge end of the burner into the sleeve 30 of the enclosure in the manner described above.

Some of the contaminated soil will likely take the form of fine dust particles, which become entrained in the gaseous airstream in the dryer before being heated sufficiently to volatilize and give up its contaminates. These dust particles are thus removed with the gaseous exhaust through the duct 22, and are separated from the airstream in the separator 40. The collected dust is then returned via the screw conveyor 44 and delivered through the inlet opening 36 into the enclosure 26. In the enclosure, the contaminated dust is mixed with the treated soil and thereby heated, causing its volatile contaminates to be released for oxidation in the burner flame. The resulting mixture of the heated soil and dust in the enclosure is then swept from the enclosure by the rake out paddles 34 and delivered to the discharge conveyor 35. Any volatiles from the returned dust particles which are not incinerated in the burner flame will be oxidized in the incinerator 46 before being released to the atmosphere.

In the drawings and specification, there has been set forth a preferred embodiment of the invention, and although specific terms are employed, they are used in a generic and description sense only and not for purposes of limitation.

That which is claimed is:

1. An apparatus for the decontamination of soil which is contaminated with petroleum products and the like and comprising
    a rotary drum dryer having an inlet end for receiving particulate material to be processed, an opposite discharge end for discharging the material therefrom, burner means for delivering heated gases into one of said ends of said drum, and an air exhaust duct adjacent the other of said ends of said dryer for the removal of the heated gases and any entrained dust particles from the interior of said dryer, and drive means for rotating said dryer so as to convey the particulate material therethrough in a cascading fashion as the drum rotates so that the particulate material is heated by contact with the heated gases,
    air cleaning means connected to said air exhaust duct of said dryer for removing the dust particles from the gases removed from said dryer,
    enclosure means fixedly mounted so as to enclose the discharge end of said dryer and such that the heated particulate material which is discharged from said discharge end is received therein,
    means for conveying the dust particles removed by said air cleaning means into said enclosure means, and
    means for intermixing the heated particulate material and the dust particles received in said enclosure means and removing the resulting mixture from said enclosure means.

2. The apparatus as defined in claim 1 wherein said enclosure means comprises a sleeve coaxially surrounding said discharge end of said dryer, and wherein said intermixing and removing means comprises a discharge opening in said sleeve and rake out paddle means mounted to said dryer for sweeping any material received in said sleeve through said discharge opening during rotation of said dryer.

3. The apparatus as defined in claim 2 wherein said sleeve defines horizontally opposite side portions, and wherein said conveying means includes an inlet opening communicating with one of said side portions of said sleeve, and said discharge opening communicates with the other of said side portions.

4. The apparatus as defined in claim 3 wherein said burner means is positioned at said discharge end of said dryer and said air exhaust duct is positioned adjacent said inlet end of said dryer, and such that the heated gases flow through said dryer in a direction counter to the movement of the particulate material through said dryer.

5. An apparatus for the decontamination of soil which is contaminated with petroleum products and the like and comprising
    a rotary drum dryer defining a central axis, with said central axis being inclined with respect to the horizontal so as to define an upper inlet end for receiving particulate material to be processed and a lower discharge end for discharging the material therefrom, burner means for delivering heated gases into said lower discharge end of said dryer, an air exhaust duct adjacent the upper inlet end of said dryer for the removal of the heated gases and any entrained dust particles from the interior of said dryer,
    drive means for rotating said dryer about said central axis so as to convey the particulate material from said inlet end to said discharge end in a cascading fashion as the dryer rotates,
    air cleaning means connected to said air exhaust duct of said dryer for removing the dust particles from the gases removed from said dryer,
    enclosure means fixedly mounted so as to enclose the discharge end of said dryer and such that the heated particulate material which is discharged from said discharge end is received therein,
    means for conveying the dust particles removed by said air cleaning means into said enclosure means, and
    means for intermixing the heated particulate material and the dust particles received in said enclosure means and removing the resulting mixture from said enclosure means.

6. The apparatus as defined in claim 5 wherein said enclosure means comprises a sleeve coaxially surrounding said discharge end of said dryer, and wherein said intermixing and removing means comprises a discharge opening in said sleeve and rake out paddle means mounted to said dryer for sweeping any material received in said sleeve through said discharge opening during rotation of said dryer.

7. The apparatus as defined in claim 6 wherein said sleeve defines horizontally opposite side portions, and wherein said conveying means includes an inlet opening communicating with one of said side portions of said sleeve, and said discharge opening communicates with the other of said side portions.

8. The apparatus as defined in claim 7 wherein said inlet opening is upstream of said discharge opening with respect to the direction of rotation of said dryer.

9. The apparatus as defined in claim 8 wherein said dryer includes internal flights positioned adjacent said discharge end for lifting the material being heated in the dryer as the dryer rotates and showering the lifted material into said enclosure at a location closely adjacent said inlet opening.

10. The apparatus as defined in claim 9 further comprising incinerator means connected to said air exhaust duct downstream of said air cleaning means for oxidizing any contaminants remaining in the gases passing therethrough and before releasing the same to the atmosphere.

11. A method of decontaminating soil and comprising the steps of
providing a rotary drum dryer having a material inlet end and a material discharge end,
passing contaminated soil through the drum dryer from the material inlet end to the material discharge end, while rotating the dryer about its axis and passing a heated gas stream through the dryer and so that the soil cascades through the heated gas stream and is heated to a temperature sufficient to volatilize substantially all of the contaminants therein,
discharging the heated and decontaminated soil from the discharge end of the rotating dryer and into a stationary enclosure which surrounds the discharge end of the dryer,
withdrawing the heated gas stream and any entrained dust particles from the rotating dryer and passing the same through a particulate separator so as to separate the entrained dust particles,
conveying the separated dust particles into said enclosure, and
mixing the heated decontaminated soil and the returned dust particles in said enclosure and so that the dust particles are heated so as to cause substantially all of any remaining contaminants therein to be volatilized.

12. The method as defined in claim 1 wherein the step of passing a heated gas stream through the dryer includes positioning a burner flame adjacent the discharge end of the dryer, and comprising the further step of causing substantially all of the volatilized contaminants which are removed from the returned dust particles in said enclosure to pass into contact with the burner flame so as to oxidize such contaminants.

13. The method as defined in claim 12 comprising the further step of passing the heated gas stream through an incinerator after having passed through the particulate separator and so as to oxidize any volatilized contaminants which may be present in the gas stream.

14. The method as defined in claim 12 wherein the step of conveying the separated dust particles into said enclosure includes delivering the separated dust particles through an inlet opening in one side of the enclosure, and comprising the further step of withdrawing the mixture of the heated decontaminated soil and the returned dust particles through a discharge opening in the opposite side of the enclosure.

15. The method as defined in claim 14 wherein the step of discharging the heated and decontaminated soil from the discharge end of the rotating drum includes lifting and showering such soil into the enclosure at a location adjacent said inlet opening so as to fall upon the dust particles being delivered through the inlet opening.

* * * * *